United States Patent [19]

Withers et al.

[11] 4,434,149

[45] Feb. 28, 1984

[54] ACID MELT TREATMENT TO ACTIVATE CARBON FOR USE AS REDUCTANT

[75] Inventors: James C. Withers; Raouf O. Loutfy, both of Tucson, Ariz.

[73] Assignee: Atlantic Richfield Company, Los Angeles, Calif.

[21] Appl. No.: 412,926

[22] Filed: Aug. 30, 1982

[51] Int. Cl.³ .............................................. C01F 7/58
[52] U.S. Cl. .................................... 423/496; 423/137; 423/415 A; 423/460; 423/DIG. 12; 423/445; 502/180; 502/418
[58] Field of Search ............... 423/DIG. 12, 133, 136, 423/137, 460, 461, 496, 445; 252/444, 410, 415 R

[56] References Cited

U.S. PATENT DOCUMENTS 4,039,648  8/1977  Haupin et al. ............. 423/DIG. 12

Primary Examiner—Edward J. Meros
Assistant Examiner—Jackson Leeds

[57] ABSTRACT

A novel method of activating carbon is provided comprising contacting the carbon with low temperature aluminum chloride acid melts comprising at least 50 mole percent aluminum chloride and less than 50 mole percent of at least one halide salt capable of exhibiting a liquid state at atmospheric conditions, e.g., sodium chloride. Carbon activated according to the present invention is useful as a reductant of the chlorination of aluminous materials to produce anhydrous aluminum chloride.

19 Claims, 3 Drawing Figures

ACID MELT TREATMENT TO ACTIVATE CARBON FOR USE AS REDUCTANT

BACKGROUND OF THE INVENTION

1. Field of the Invention

This invention relates to solid reducing agents such as those used in chlorination processes, and, in particular, to a method of activating solid carbon reductants.

2. Description of the Prior Art

The rate of carbon consumption is an important factor in a number of metallurgical processes. For example, in the production of anhydrous aluminum chloride, from aluminous raw material, as a precursor for producing aluminum, carbon or carbon monoxide is used as a reductant according to the following equations:

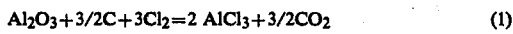

$$Al_2O_3 + 3/2C + 3Cl_2 = 2\,AlCl_3 + 3/2CO_2 \tag{1}$$

$$Al_2O_3 + 3CO + 3Cl_2 = 2AlCl_3 + 3CO_2 \tag{2}$$

The rate of reaction (2) is significantly higher than reaction (1). However, the use of carbon monoxide as a reductant in reaction (2) requires the generation of carbon monoxide from carbon. Thus, for either chlorination reaction, the activation of carbon is desirable to both increase the rate and/or lower the reaction temperature. For the chlorination of aluminous materials, such as partially calcined alumina (PCA), metal grade alumina (MGA) and partially calcined aluminum chloride hexahydrate (ACH), an increased reaction rate at lower operating temperatures can be achieved with a highly activated carbon.

Petroleum coke is a known source of carbon reductants. Green petroleum coke, i.e., uncalcined coke, is known to have a moderate level of activity. However, a serious disadvantage is that it contains significant quantities of hydrogen and hydrocarbons which are chlorinated during the chlorination process. Not only does their presence result in increased consumption of expensive chlorine, but the hydrogen and hydrocarbons interfere with the chlorination reaction kinetics due to their vapor pressure over the surface of the solid reductant. Calcining coke drives off the hydrogen and hydrocarbons but to a great extent also deactivates the carbon. Fully calcined or "dead-burned" coke has very low activity insofar as chlorination reaction kinetics are concerned, but is essentially free of excess hydrogen and hydrocarbons. Accordingly, methods of activating partially and fully calcined coke have been sought after for some time.

Carbon is a highly refractory or inert material, that is, not readily susceptible to chemical attack. One substance known to attack carbon is an acid melt of aluminum chloride. By aluminum chloride melt is meant a mixture of salts, typically halide salts, containing greater than 50 mole percent aluminum chloride. Aluminum chloride itself sublimes rather than melts. Thus, in order to have aluminum chloride liquids, other salts which do melt, i.e., salts capable of maintaining a liquid state at atmospheric conditions, must be present.

It is also known that certain chloride salts, namely, the alkali chlorides, and to a lesser extent the alkaline earth chlorides and double chlorides such as sodium aluminum chloride, will catalyze reaction (1). For example, the chlorination reaction of "dead-burned" alumina ($Al_2O_3$) with "dead-burned" carbon takes place at an exceeding slow rate. However, it is known that the addition of even a nominal amount of sodium chloride, e.g., 10 weight percent, will improve the kinetics and increase the reaction rate.

Despite knowledge of the catalytic effect of certain chloride salts upon reaction (1) and knowledge that acid melts are capable of attacking carbon, it has heretofore gone unrecognized that solid carbon particles including "dead-burned" carbon can be highly activated to an extent which renders them useful as reducing agents in processes such as that in reaction (1) by treatment with certain acid melts.

SUMMARY OF THE INVENTION

A novel method of activating carbon is provided comprising reacting or contacting the carbon with low temperature acidic melts such as those comprising at least 50 mole percent aluminum chloride and less than 50 mole percent of at least one halide salt capable of exhibiting a liquid state at atmospheric conditions.

BRIEF DESCRIPTION OF THE DRAWINGS

FIG. (1) is a block diagram depicting an acid melt treatment according to the present invention and use of the carbon thus activated as a reducing agent in a process of producing anhydrous aluminum chloride.

FIG. (2) is a block diagram depicting a second embodiment of the present invention wherein carbon activated according to the present invention is used to produce a carbon monoxide reductant from recycle carbon dioxide for the chlorination process.

Figure 1:
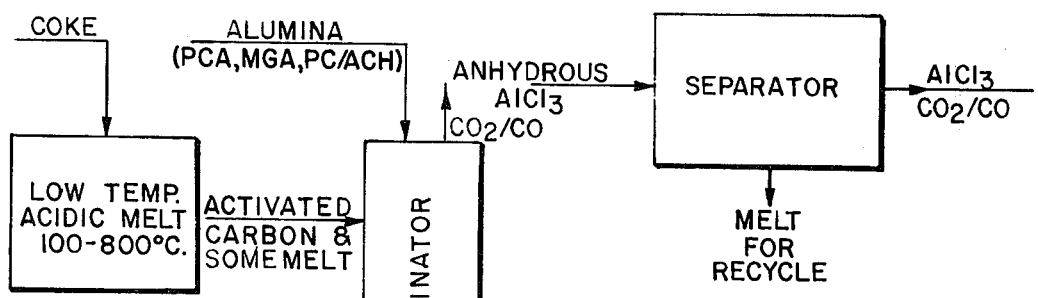
Figure 2:
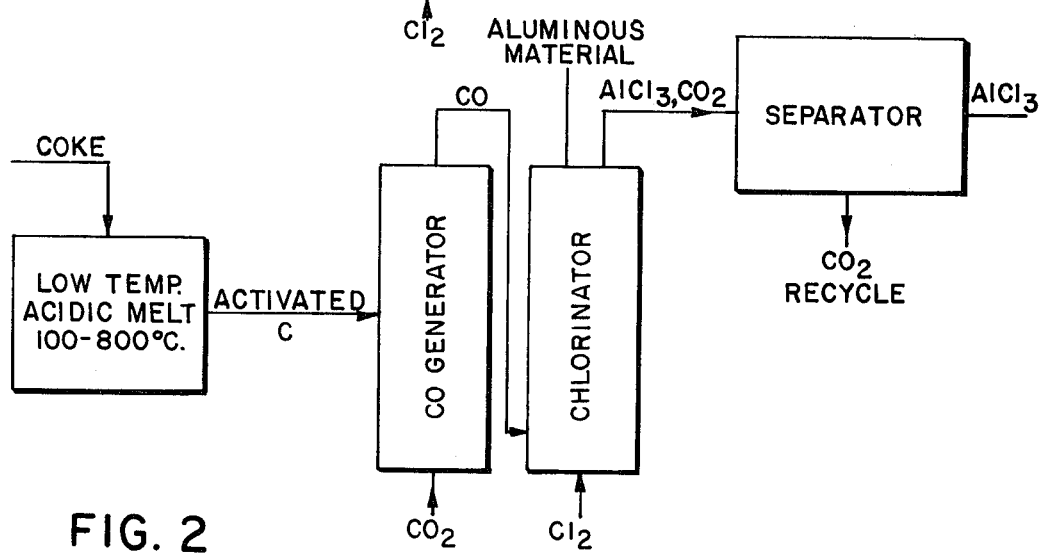
Figure 3:
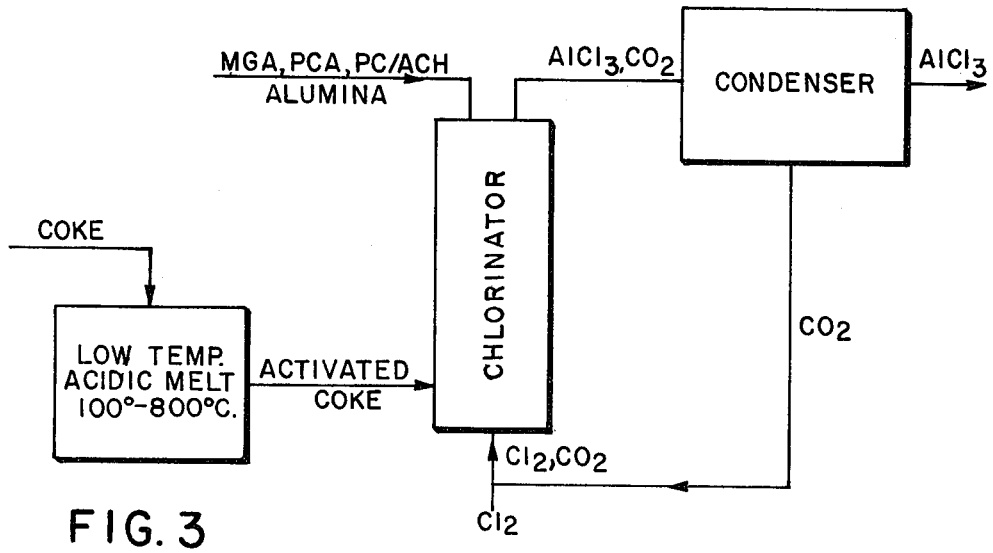

FIG. (3) is a block diagram depicting a third embodiment of the present invention wherein carbon activated according to the present invention is utilized to produce in situ the carbon monoxide reductant for chlorination.

DETAILED DESCRIPTION OF THE INVENTION

The production of aluminum via aluminum chloride electrolysis has the potential of significant savings in energy consumption over presently used processes for the production of aluminum. However, the production of aluminum chloride from aluminous raw material is a critical problem step. Low temperature and high rate of chlorination are the essential elements for economically acceptable chlorination processes. The activation of carbon, either to produce carbon monoxide or for direct use in the chlorination, offers the possibility of accomplishing both increased kinetics and low temperature chlorination.

The primary source for carbon reductants activated according to the present invention is petroleum coke. Untreated (green) petroleum coke is typically partially or fully calcined by heating to a temperature of about 1200° C. to about 1600° C. Most commercially available coke is fully calcined. Coke particles which have been at least partially calcined and which have a size from 2 to about 400 mesh are preferred.

The coke particles are then exposed to an acidic melt at a temperature of from about 100° C. to about 800° C., preferably 100° C. to about 400° C., for a time period of about 15 minutes to about 2 hours. While not intending to be bound by the following theory, it is believed that the anhydrous melt adheres to the carbon particles pursuant to Van der Waals forces generated therein and activates the carbon surface by a chemical etching. The resultant activated carbon provides a faster rate of reductive chlorination because its surface has been modified. In addition, where carbon activated according to the present invention is utilized to produce in situ the carbon monoxide for the reductive chlorination of aluminous materials to form aluminum chloride, the melt composition may be judiciously selected so that any residual melt entering the chlorinator will catalytically enhance the reaction as well, e.g., where the acid melt contains sodium chloride.

Acid melts useful in the process of the present invention comprise at least 50 mole percent, preferably 50 to about 60 mole percent, aluminum chloride with the remainder of the melt comprising alkali chloride and/or alkaline earth chloride salts and mixtures thereof. In addition, the melt may contain up to 40 mole percent, preferably up to 20 mole percent, of a metal fluoride wherein the metal is selected from Groups I, II and III of the Periodic Chart, e.g., the fluorides of lithium, sodium, potassium, magnesium, calcium, barium, boron and aluminum, or other chemicals known to etch or otherwise attack carbon. The preferred acid melt composition comprises 50 to about 60 mole percent $AlCl_3$ and about 40 to about 50 mole percent of a metal chloride with sodium chloride being preferred due to low cost and ready availability.

FIG. (1) depicts an embodiment of the present invention wherein carbon, i.e., fully or partially calcined coke, is activated by contacting the carbon particles with an acid melt according to the present invention at temperatures in the range of about 100° C. to about 800° C., preferably about 120° C. to about 400° C., for a time period of 15 minutes to 2 hours. The activated carbon is removed from the melt by known processes of solid/liquid separation, such as a cyclone or centrifuge. The activated carbon and residual amounts of the melt, typically from about 0.1 to about 5 weight percent, are placed in a chlorinator, such as a fluidized bed, with chlorine gas and aluminous materials selected from the group consisting of partially calcined alumina, metal grade alumina, and partially calcined aluminum chloride hexahydrate. Chlorination is effected at a temperature from about 550° C. to about 900° C. for a time period of from about 15 minutes to about 2 hours. Anhydrous aluminum chloride along with carbon monoxide and carbon dioxide exit the chlorinator and are separated from any residual melt. The melt may be advantageously recycled back to the activation bath.

FIG. (2) depicts a schematic for carbon monoxide generation for use as the reductant in the chlorination of aluminous material as hereinbefore described. Activated carbon enters a carbon monoxide generator into which carbon dioxide is fed. The carbon monoxide generator is typically a fluidized bed reactor operating at a temperature of from about 950° C. to about 1200° C. and a pressure of about 1 to about 5 atmospheres. A fixed bed or entrained bed reactor is also acceptable.

FIG. (3) depicts a third embodiment of the present invention wherein carbon activated according to the present invention is utilized to generate carbon monoxide in situ during chlorination of aluminous materials utilizing the carbon monoxide as the reductant. The activated carbon enters the chlorinator with chlorine gas, carbon dioxide gas and aluminous material. Aluminum chloride and carbon dioxide produced during the chlorination reaction enter a condenser in which the carbon dioxide is separated off and advantageously recycled to the chlorinator.

The following example is provided by way of illustration and not by way of limitation.

EXAMPLE

Fully calcined coke (100 mesh) was soaked in an acid melt comprising $AlCl_3$ (60 mol%), and NaCl (40 mol%) at 170° C. for about 2 hours. The melt was drained and the coke was reground and used in the reductive chlorination of aluminum chloride hexahydrate calcined at 400° C. in a 1″ fluidized bed reactor at 550° C. Fully calcined coke (FCC) not activated according to the present invention was utilized for the chlorination of a sample of the same partially calcined ACH. The results are reported in Table 1.

TABLE 1

| (Reductant Type) | Chlorinator Rate (g $AlCl_3$/min) |
|---|---|
| Activated FCC Run 1 | .079 |
| Run 2 | .091 |
| FCC (without activation) | .039 |

Although the foregoing invention has been described in some detail by way of illustration and example for purposes of clarity and understanding, it will be obvious that certain changes and modifications may be practiced within the scope of the invention, as limited only by the scope of the appended claims.

What is claimed is:

1. A method of activating a solid carbon reductant comprising introducing a solid carbon reductant into a liquid anhydrous acid melt consisting essentially of greater than 50 mole percent aluminum chloride and less than 50 mole percent of at least one other halide salt and separating the carbon solid from the acid melt.

2. A method according to claim 1 wherein said at least one halide salt is selected from the group consisting of alkali halides, alkaline earth halides and mixtures thereof.

3. A method according to claims 1 and 2 wherein said contacting is at a temperature of from about 100° C. to about 800° C.

4. A method according to claim 3 wherein said contacting is at a temperature of from about 100° C. to about 400° C.

5. A method according to claim 1 wherein said acid melt comprises a mixture of greater than 50 mole percent aluminum chloride and less than 50 mole percent of a salt selected from the group consisting of sodium chloride, lithium chloride and potassium chloride.

6. A method according to claim 5 wherein said melt comprises up to about 60 mole percent aluminum chloride and from about 40 to less than 50 mole percent sodium chloride.

7. A method according to claim 5 wherein said acid melt further comprises up to 40 mole percent metal fluoride wherein the metal is selected from the group consisting of Groups I, II, and III of the Periodic Table.

8. A method according to claim 7 wherein said acid melt comprises about 20 mole percent lithium fluoride.

9. A method of producing anhydrous aluminum chloride comprising:
   (a) contacting a carbon solid selected from the group consisting of fully calcined coke and partially calcined coke with a liquid anhydrous acid melt comprising greater than 50 mole percent aluminum chloride and less than 50 mole percent of at least one other halide salt to activate said carbon solid for use as a reductant;
   (b) separating the activated carbon solid from the acid melt;

(c) chlorinating aluminous material at a temperature of from about 550° C. to about 900° C. for a time period of from about 15 minutes to about 2 hours in the presence of a reductant comprising the activated carbon solid of step (b).

10. A method according to claim 9 wherein the contact of step (a) is at a temperature of from about 100° C. to about 800° C.

11. A method according to claim 9 wherein the other halide salt is selected from the group consisting of alkali halides, alkaline earth halides and mixtures thereof.

12. A method according to claim 11 wherein said acid melt comprises greater than 50 to about 60 mole percent aluminum chloride and from about 40 to less than 50 mole percent sodium chloride.

13. A method according to claim 11 wherein said acid melt further comprises up to about 40 mole percent of a metal fluoride wherein the metal is selected from the group consisting of groups I, II and III of the Periodic Table.

14. A method according to claim 9 wherein said chlorination takes place in the presence of a residual amount of said acid melt.

15. A method according to claim 14 wherein said residual amount is from about 0.10 to about 5 percent.

16. A method according to claim 15 wherein said acid melt comprises about 60 mole percent aluminum chloride and about 40 mole percent sodium chloride.

17. A method of producing anhydrous aluminum chloride comprising:
 (a) contacting a carbon solid selected from the group consisting of fully calcined coke and partially calcined coke with a liquid anhydrous acid melt comprising greater than 50 mole percent aluminum chloride and less than 50 mole percent of at least one other halide salt to activate said carbon solid for use as a reductant;
 (b) separating the activated carbon solid from the acid melt;
 (c) chlorinating aluminous material selected from the group consisting of alumina and partially calcined aluminum chloride hexahydrate in the presence of carbon monoxide produced from the activated carbon solid of step (b).

18. A method according to claim 17 wherein said carbon monoxide is generated in situ during said chlorination.

19. A method according to claim 18 wherein said acid melt comprises about 60 mole percent aluminum chloride and about 40 mole percent sodium chloride.

* * * * *